United States Patent
Yamashita et al.

(10) Patent No.: US 10,425,879 B2
(45) Date of Patent: Sep. 24, 2019

(54) CONTROL DEVICE, CONTROL METHOD, AND COMPUTER-READABLE RECORDING MEDIUM

(71) Applicant: FUJITSU LIMITED, Kawasaki-shi, Kanagawa (JP)

(72) Inventors: Koichiro Yamashita, Hachioji (JP); Toshiya Otomo, Kawasaki (JP); Takahisa Suzuki, Yokohama (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 15/649,109

(22) Filed: Jul. 13, 2017

(65) Prior Publication Data

US 2017/0311222 A1  Oct. 26, 2017

Related U.S. Application Data

(63) Continuation of application No. PCT/JP2015/050971, filed on Jan. 15, 2015.

(51) Int. Cl.
  *H04W 40/10* (2009.01)
  *H04W 52/02* (2009.01)
  *H04W 84/18* (2009.01)

(52) U.S. Cl.
  CPC .......... *H04W 40/10* (2013.01); *H04W 52/02* (2013.01); *H04W 52/0261* (2013.01); *H04W 84/18* (2013.01); *Y02D 70/00* (2018.01); *Y02D 70/326* (2018.01)

(58) Field of Classification Search
  CPC ..... H04W 40/10; H04W 40/04; H04W 52/00; H04W 52/02; H04W 52/0261;
  (Continued)

(56) References Cited

U.S. PATENT DOCUMENTS

2010/0085903 A1* 4/2010 Pandey ............... H04L 12/10
                                                           370/311
2013/0121176 A1  5/2013 Addepalli et al.
(Continued)

FOREIGN PATENT DOCUMENTS

JP  2004-282268   10/2004
JP  2006-211389   8/2006
(Continued)

OTHER PUBLICATIONS

Sakie Horiuchi, "Impact of Sleep Control Based on Residual Energy on Energy Harvesting Wireless Devices" The Institute of Electronics, Information and Communication Engineers Technical Report, Feb. 27, 2014, vol. 113, No. 473, p. 47-52.
(Continued)

Primary Examiner — Rownak Islam
(74) Attorney, Agent, or Firm — Staas & Halsey LLP (57) ABSTRACT

A control device includes: a processor configured to: control a multihop communication path in a wireless network that includes a node group; when a first power storage speed of a target relay node in the node group is negative, calculate a first estimated time that is needed to reach a target power-storage value in a case where the target relay node is in a non-relay operating state; and in accordance with a length of the first estimated time calculated, change a state of the target relay node into the non-relay operating state or a stop state and change a state of another node, which is in the non-relay operating state, into a relay operating state.

6 Claims, 8 Drawing Sheets

(58) Field of Classification Search
CPC ..... H04W 84/18; Y02D 70/00; Y02D 70/326; Y02D 70/30
USPC .......................................................... 370/252
See application file for complete search history.

(56) References Cited

U.S. PATENT DOCUMENTS

2015/0092580 A1* 4/2015 Park .................... H04L 43/0817
                                                        370/252
2017/0285598 A1* 10/2017 Fitch ........................ H02J 3/14

FOREIGN PATENT DOCUMENTS

| JP | 2011-13765 | 1/2011 |
| JP | 2012-227756 | 11/2012 |

OTHER PUBLICATIONS

Yusuke Kawai, "A Discussion on Transmission Power Control for Energy Harvestig Wireless Sensor Networks", IPSJ SIG Notes 2012 (Heisei24), Nendo, [CD-ROM], Jun. 15, 2012.

Masashi Kunikawa, "A Fair Polling Scheme for Energy Harvesting Wireless Sensor Networks", Proceedings of the 58th Annual Conference of the Institute of Systems, Control and Information Engineers [CDROM, May 21, 2014.

Joseph, V et al, "Optimal Sleep-Wake Policies for an Energy Harbesting Sensor Node", Communications, 2009.ICC 2009. IEEE International Conference on, IEEE, Jun. 14, 2009.

International Search Report dated Apr. 14, 2015 in corresponding Application No. PCT/JP2015/050971.

Written Opinion of International Search Authority dated Apr. 14, 2015 in corresponding International Patent No. PCT/JP2015/050971.

* cited by examiner

| SAMPLE | POWER GENERATION SPEED | CONDITION |
|---|---|---|
| 1 | 75 | SPRING/ MORNING |
| 2 | 75 | FALL/ MORNING |
| 3 | 100 | FALL/ NOON |
| ⋮ | ⋮ | ⋮ |
| 100 | 60 | WINTER/ NIGHT |

CONTROL DEVICE, CONTROL METHOD, AND COMPUTER-READABLE RECORDING MEDIUM

CROSS-REFERENCE TO RELATED APPLICATION

This application is a continuation application of International Application No. PCT/JP2015/050971, filed on Jan. 15, 2015 and designating the U.S., the entire contents of which are incorporated herein by reference.

FIELD

The embodiment discussed herein is related to a control device, a control method, and a computer-readable recording medium.

BACKGROUND

In recently disclosed "wireless sensor networks", sensor nodes, including a wireless communication unit and a sensor, are provided on observation areas to collect sensing information in a "collection cycle (i.e., a sample cycle of a sensing value)". For example, each sensor node in the wireless sensor network includes an energy harvesting unit that generates electricity by converting environmental energy (e.g., sunlight or oscillations) into electric energy; and a battery that stores electricity that is generated by the energy harvesting unit. Furthermore, each sensor node operates by using the electricity that is stored in the battery.

Furthermore, the sensing value, measured by each sensor node in the wireless sensor network, is reported to "a control device (i.e., a network device)" via a gateway device. Here, for example, the wireless sensor network has a tree-type topology. Specifically, the wireless sensor network includes a sensor node (i.e., "relay node") that is in a "relay operating state" to relay transmission of the sensing value that is measured by a different sensor node; and a sensor node (i.e., "end node") that is in a "non-relay operating state". The sensing value, measured by each sensor node, is transmitted from each sensor node to the gateway device directly or via one or more relay nodes. That is, the wireless sensor network includes "the multihop communication path".

Furthermore, the relay node transmits the sensing value of its own and transfers (i.e., receives and transmits) the sensing value of the end node that is located under it; therefore, compared to the end node, "the power consumption speed (the amount of consumed power)" in one collection cycle is high. Therefore, there is a possibility that "the amount of stored power" of the battery of the relay node becomes insufficient and the relay node has difficulty in operating in a stable manner. That is, there is a possibility that the multihop communication path becomes unstable.

Therefore, there is a disclosed technology in which the amount of stored power of each sensor node in the future is predicted in accordance with the prepared "prediction model (target function)" and the multihop communication path is selected based on the predicted amount of stored power.
Patent Document 1: Japanese Laid-open Patent Publication No. 2006-211389

However, the electrical characteristics of batteries (secondary batteries, such as lithium batteries) vary widely depending on batteries (i.e., individuals). Specifically, the battery electrical characteristics are such that the electromotive forces may be considered to be constant until certain timing but, after the certain timing, the electromotive forces are rapidly reduced (dropped). Furthermore, there are variations in batteries as to the timing of dropping, the way of dropping, etc. Moreover, the battery electric characteristics are changed due to effects of the external environment, such as temperature. Hence, it is difficult to prepare the prediction model itself.

Furthermore, it is considered that, in order to stabilize the multihop communication path, before the amount of stored power of the relay node reaches "a dangerous level", in which it is difficult for the relay node to operate in a stable manner, the state of the relay node is changed into "a non-relay operating state", that is, the relay node is changed into an end node.

However, as described above, there are variations in batteries as to the timing of dropping, the way of dropping, etc. Furthermore, the battery electric characteristics are changed due to effects of the external environment, such as temperature. Therefore, it is difficult to previously set the above-described "dangerous level".

SUMMARY

According to an aspect of the embodiments, a control device includes: a processor configured to: control a multihop communication path in a wireless network that includes a node group; when a first power storage speed of a target relay node in the node group is negative, calculate a first estimated time that is needed to reach a target power-storage value in a case where the target relay node is in a non-relay operating state; and in accordance with a length of the first estimated time calculated, change a state of the target relay node into the non-relay operating state or a stop state and change a state of another node, which is in the non-relay operating state, into a relay operating state.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Preferred embodiments will be explained with reference to accompanying drawings. Furthermore, the control device, the control method, and the control program, disclosed in the subject application, are not limited to the embodiment. Moreover, in the embodiment, the components that have the same functionality are attached with the same reference numeral, and duplicated explanations are omitted.

Outline of a Wireless Sensor Network System

Figure 1:
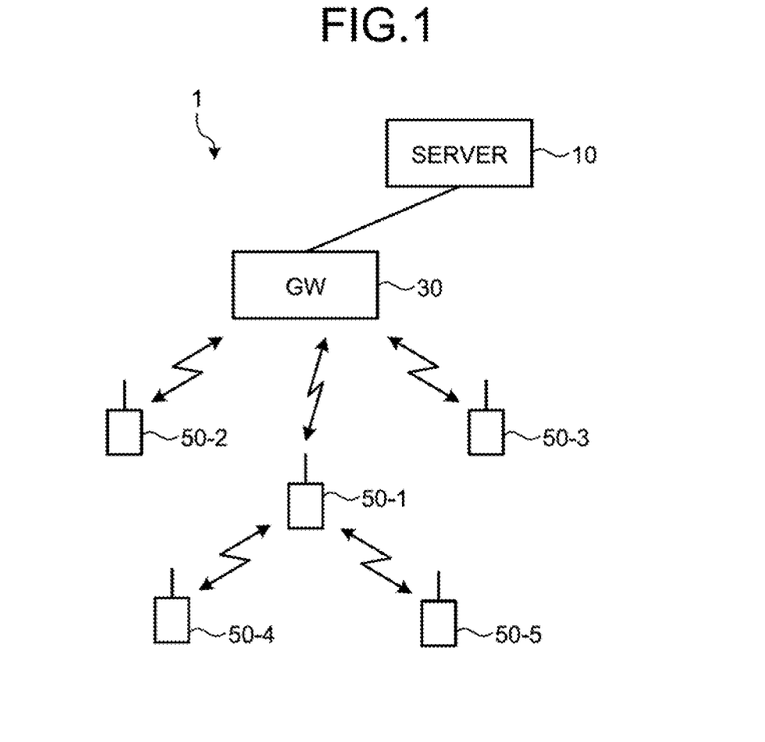
FIG. 1 is a diagram that illustrates an example of a wireless sensor network system according to an embodiment.

FIG. 1 is a diagram that illustrates an example of a wireless sensor network system according to an embodiment. In FIG. 1, a wireless sensor network system 1 includes a server 10 as the control device, a gateway (GW) 30 that is connected to the server 10 with a wired line directly or indirectly, and sensor nodes 50-1 to 5. Hereafter, if the sensor nodes 50-1 to 5 are not particularly distinguished, they are sometimes collectively referred to as a "sensor node 50". Here, the number of the gateway 30 is one and the number of the sensor nodes 50 is five; however, this is not a limitation.

The topology of the wireless sensor network system 1, illustrated in FIG. 1, is an example of the result of the network that is configured in accordance with the "network configuration procedure". The "network configuration procedure" is as follows.

First, each of the sensor nodes 50 transmits "beacon".

Secondly, when the gateway 30 receives the beacon, it transmits a "link formation signal" to the sensor node 50, which is the transmission source of the beacon. The "link formation signal" is the signal for forming a wireless link with the sensor node 50, which is the transmission destination of the signal. Thus, in the example of FIG. 1, a wireless link is formed between the gateway 30 and each of the sensor nodes 50-1 to 3.

Thirdly, if the sensor node 50 (here, the sensor nodes 50-1 to 3), which forms a wireless link with another node (here, the gateway 30), receives a beacon from the sensor node 50 that does not form a wireless link with the another node, it transmits a link formation signal to the sensor node 50 that is the transmission source of the beacon. Thus, in the example of FIG. 1, a wireless link is formed between the sensor node 50-1 and each of the sensor nodes 50-4, 5.

Hence, "the topology" is formed such that the sensor nodes 50-1 to 3 are present immediately under the gateway 30 and the sensor nodes 50-4, 5 are present immediately under the sensor node 50-1. Specifically, if the gateway 30 is a layer 0, the sensor nodes 50-1 to 3 are a layer 1, and the sensor nodes 50-4, 5 are a layer 2 that is under the sensor node 50-1. In the wireless sensor network system 1 with this topology, the sensor node 50-1 is in a "relay operating state", and each of the sensor nodes 50-2, 3, 4, and 5 is in a "non-relay operating state". That is, in the wireless sensor network system 1 with this topology, the sensor node 50-1 is a relay node 50, and each of the sensor nodes 50-2, 3, 4, and 5 is an end node 50.

Furthermore, each of the sensor nodes 50 transmits a sensing value to the server 10 via the gateway 30 in each "sensing-value report cycle". Hereafter, the "sensing-value report cycle" is referred to as a "second report cycle", and the period that corresponds to 1 cycle of the "sensing-value report cycle" is sometimes referred to as the "second period". The sensing value, transmitted from each of the sensor nodes 50-1 to 3, is directly transmitted to the gateway 30. On the other hand, the sensing value, transmitted from each of the sensor nodes 50-4, 5, is transmitted to the gateway 30 via the sensor node 50-1 (i.e., the relay node 50).

Furthermore, for example, when the network is configured, each of the sensor nodes 50 reports, to the server 10, "a consumed-power amount Ee" in each of the above-described sensing-value report cycles in a case where each of the sensor nodes 50 is in the "non-relay operating state" (that is, in a case where it is the end node 50). Here, "the consumed-power amount Ee" is the amount of power that is needed by each of the sensor nodes 50 to transmit the sensing value that is measured by itself. Furthermore, the target relay node 50 (here, the sensor node 50-1), which is included in the sensor nodes 50-1 to 5, reports, to the server 10, "a consumed-power amount Er" in each of the above-described sensing-value report cycles in a case where it is in the "relay operating state" (that is, in a case where it is the relay node 50). Here, "the consumed-power amount Er" is the sum of the amount of power that is needed by the target relay node 50 to transmit the sensing value that is measured by itself and the amount of power that is needed to transmit the sensing value that is measured by each of the end nodes 50, which are present under the target relay node 50. Specifically, in the example of FIG. 1, the consumed-power amount Er of the sensor node 50-1 is the sum of the amount of power that is needed to transmit the sensing value that is measured by the sensor node 50-1 one time, the amount of power that is needed to receive and transmit the sensing value that is measured by the sensor node 50-4 one time, and the amount of power that is needed to receive and transmit the sensing value that is measured by the sensor node 50-5 one time. Therefore, the consumed-power amount Er of the target relay node 50 becomes larger in accordance with an increase in the number of the end nodes 50 that are present under it.

Furthermore, the target relay node 50 (here, the sensor node 50-1), included in the sensor nodes 50-1 to 5, reports "a stored-power amount E(n)", which remains in the battery at that time, in each "stored-power amount report cycle" to the server 10. Hereafter, "the stored-power amount report cycle" is referred to as a "first report cycle", and the period that corresponds to one cycle of "the stored-power amount report cycle" is sometimes referred to as the "first period". Furthermore, in the following explanation, the above-described "first period" and the "second period" match each other.

Furthermore, the server 10 calculates "a power storage speed δ (hereafter, sometimes referred to as a "first power storage speed δ(n)")" of the target relay node 50 (here, the sensor node 50-1). Specifically, "the first power storage speed" is the power storage speed of the target relay node 50 that is in the relay operating state, and it is calculated by using the following Equation (1).

$$\delta(n)=E(n)-E(n-1) \quad (1)$$

Here, E(n) is the amount of stored power that is reported during the nth first period, and E(n−1) is the amount of stored power that is reported during the n−1th first period. That is, the first power storage speed δ(n) is the power storage speed that corresponds to the nth first period.

Furthermore, if the first power storage speed δ of the target relay node 50 is negative, the server 10 calculates "a first estimated time T" that is needed to reach "the target power-storage value" in a case where the target relay node 50 is in a non-relay operating state. The "target power-storage value" is for example the amount of stored power when the battery of the target relay node 50 is fully charged (i.e., a full stored-power amount Emax). In the following explanation, "the target power-storage value" is the full stored-power amount Emax. Each of the sensor nodes 50 reports the full stored-power amount Emax to the server 10 as is the case with the above-described consumed-power amount Er.

Then, based on the length of the calculated first estimated time, the server 10 causes the state of the target relay node 50 to change into a non-relay operating state or "a stop (dormant) state" and causes the state of the different sensor node 50 (here, at least one of the sensor nodes 50-2, 3, 4, and 5), which is in a non-relay operating state, to change into a relay operating state. Here, "the stop state" means for example the state where it operates as neither a relay node nor an end node and it is dedicated to power generation and power storage.

As described above, if the first power storage speed δ of the target relay node 50 is negative, the server 10 changes the function (i.e., the state) of the target relay node 50 and changes the state of the different sensor node 50, which is in a non-relay operating state, into a relay operating state. Therefore, it is possible to change the function of the relay node 50, which is likely to run out of electric power, before it runs out of electric power; thus, the multihop communication path of the wireless sensor network system 1 may be stabilized.

Furthermore, if the length of the calculated first estimated time is more than "a predetermined time length", the server 10 changes the state of the target relay node 50 into a stop state and, if the length of the calculated first estimated time is equal to or less than "the predetermined time length", changes the state of the target relay node 50 into a non-relay operating state. Thus, if it is estimated that it takes a long time to reach the target power-storage value even though the target relay node 50 enters a non-relay operating state, it is dedicated to power generation and power storage; thus, the target relay node 50 may promptly return to a desirable power state. As a result, the target relay node 50 may aid in stabilizing the multihop communication path after it returns to the multihop network.

Example of the Configuration of the Sensor Node

Figure 2:
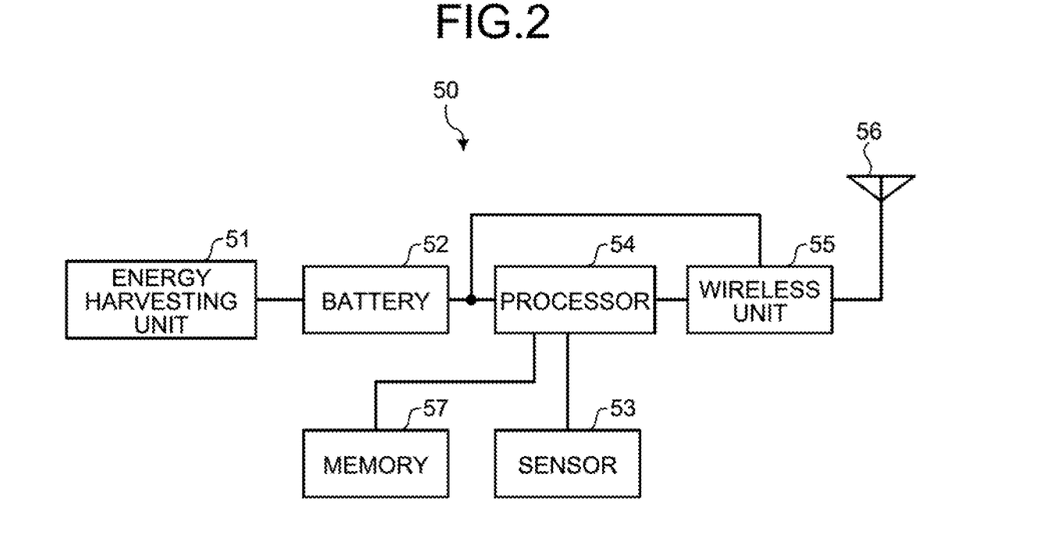
FIG. 2 is a block diagram that illustrates an example of the sensor node according to the embodiment.

FIG. 2 is a block diagram that illustrates an example of the sensor node according to an embodiment. In FIG. 2, the sensor node 50 includes an energy harvesting unit 51, a battery 52, a sensor 53, a processor 54, a wireless unit 55, an antenna 56, and a memory 57. Examples of the processor 54 include a CPU, a digital signal processor (DSP), or a field programmable gate array (FPGA). Furthermore, examples of the memory 57 include a random access memory (RAM), such a synchronous dynamic random access memory (SDRAM), a read only memory (ROM), or a flash memory. Various processing functions, performed by the processor 54, are implemented in such a manner that the programs corresponding to the various processing functions are recorded in the memory 57 and each of the programs is executed by the processor 54.

The energy harvesting unit 51 uses environmental energies (e.g., sunlight or oscillations) to generate electricity and outputs the generated electricity to the battery 52.

The battery 52 stores the electricity, generated by the energy harvesting unit 51, and feeds the stored electricity to the processor 54 and the wireless unit 55.

The sensor 53 outputs measured sensing values to the processor 54.

The processor 54 generates "beacon" and transmits the generated beacon via the wireless unit 55 and the antenna 56 in a predetermined cycle.

Furthermore, the processor 54 transmits sensing values, received from the sensor 53, via the wireless unit 55 and the antenna 56 in each "sensing-value report cycle".

Furthermore, the processor 54 measures "the communication quality (LQI: Link Quality Indicator)" between the node of its own and the different sensor node 50. Then, the processor 54 transmits the identification information on the different sensor node 50 (i.e., the identification information on the neighboring node, which is the different sensor node 50 that is located in the neighborhood of the node of its own) and the measured communication quality via the wireless unit 55 and the antenna 56. The identification information on the neighboring node and the communication quality are reported to the server 10 via the relay node 50 or the gateway 30. Furthermore, the communication quality (LQI) may be reported in the same cycle as that of "the stored-power amount E(n)". Moreover, the communication quality (LQI) may be reported only in the case of a predetermined level (e.g., equal to or more than 20 [dB]).

Furthermore, for example, when the network is configured, the processor 54 transmits the above-described "consumed-power amount Ee" via the wireless unit 55 and the antenna 56.

Furthermore, for example, when the network is configured, the processor 54 transmits the above-described "consumed-power amount Er" via the wireless unit 55 and the antenna 56 if the node of its own is in a relay operating state.

Moreover, the processor 54 transmits "the stored-power amount E(n)", which remains in the battery at that time, via the wireless unit 55 and the antenna 56 in each "stored-power amount report cycle".

The wireless unit 55 performs wireless transmission processing (digital-analog conversion, up-conversion, or the like) on signals that are received from the processor 54 and transmits the obtained radio signals via the antenna 56. Furthermore, the wireless unit 55 performs wireless reception processing (down-conversion, analog-digital conversion, or the like) on radio signals that are received via the antenna 56 and outputs the obtained reception signals to the processor 54.

Example of the Configuration of the Server

Figure 3:
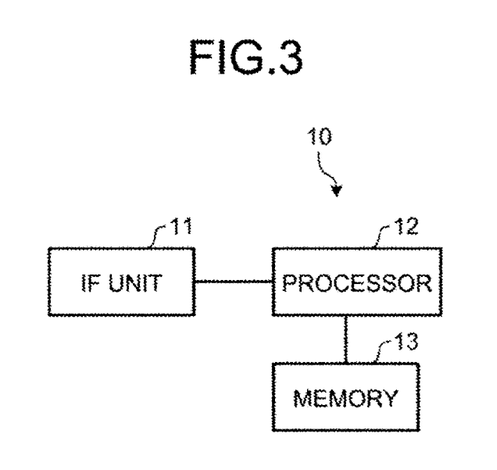
FIG. 3 is a block diagram that illustrates an example of the server according to the embodiment.

FIG. 3 is a block diagram that illustrates an example of the server according to an embodiment. In FIG. 3, the server 10 includes an interface unit 11, a processor 12, and a memory 13. Examples of the processor 12 include a CPU, a digital signal processor (DSP), or a field programmable gate array (FPGA). Furthermore, examples of the memory 13 include a random access memory (RAM), such a synchronous dynamic random access memory (SDRAM), a read only memory (ROM), or a flash memory. Various processing functions, performed by the processor 12, are implemented in such a manner that the programs corresponding to the various processing functions are recorded in the memory 13 and each of the programs is executed by the processor 12.

The interface unit 11 is an interface that performs communication with the gateway 30 via a wired line directly or indirectly. The interface (IF) unit 11 receives various types of information, transmitted from the sensor node 50, via the gateway 30 and outputs it to the processor 12.

The processor 12 receives various types of information, transmitted from the sensor node 50, via the IF unit 11 and stores the received various types of information in the memory 13.

Furthermore, the processor 12 calculates the first power storage speed δ(n) by using the above-described Equation (1) based on the stored-power amount E(n) of the nth first period and the stored-power amount E(n−1) of the previous n−1th first period, transmitted from each of the relay nodes 50.

Furthermore, if the first power storage speed δ is negative, the processor 12 calculates "the power generation speed h(n)" of the target relay node 50 by using the following Equation (2). Here, the processor 12 stores the calculated power generation speed h(n) in the memory 13. Furthermore, at this time, the processor 12 may store the calculated power generation speed h(n) in the memory 13 in relation to the type information (e.g., a period of time (morning, noon, night, or the like) or a season (spring, summer, fall, or winter)) on the first period that corresponds to the power generation speed h(n).

$$h(n)=Er+\delta(n) \tag{2}$$

Furthermore, the processor 12 calculates a power storage speed δ'(n) (hereafter, sometimes referred to as the "second power storage speed δ'(n)") in a case where the target relay node 50 enters a non-relay operating state by using the following Equation (3).

$$\delta'(n)=h(n)-Ee \tag{3}$$

Here, h(n) is a result of calculation by using the above-described Equation (2).

Furthermore, the processor 12 uses the following Equation (4) to calculate "a second estimated time T'" that is needed to reach the target power-storage value in a case where the target relay node 50 is in a non-relay operating state.

$$T'=(E\max-E(n))\div\delta'\times(\text{the time length of the first period}) \tag{4}$$

Furthermore, the processor 12 calculates "a variance value σ" of the first power storage speeds δ that correspond to the first periods and that are stored in the memory 13. Here, the first power storage speeds δ, which are used to calculate "the variance value σ", may be limited to the ones that have the common type information on the power generation speed h(n), which is used to calculate the first power storage speed δ.

Then, if the calculated variance value σ is more than "a first threshold", the processor 12 multiplies "the second estimated time T'" by "the weight coefficient" that corresponds to "the likelihood" of the power generation speed h(n) that corresponds to the nth first period, thereby calculating the above-described "first estimated time T". Here, "the likelihood" of the power generation speed h(n) is an index that indicates the certainty of the value of the power generation speed h(n). Specifically, "the likelihood" of the power generation speed h(n) is, for example, the probability at which the power generation speed h(n), acquired in the nth first period, occurs in the power generation speeds h that are acquired before the nth first period. The value of "the weight coefficient" is decreased as "the likelihood" of the power generation speed h(n) is increased. Furthermore, the power generation speed h(n), which is used to calculate "the likelihood", may be limited to the ones that have the common type information. Here, if the calculated variance value σ is equal to or less than "the first threshold", the processor 12 does not perform a particular process but waits until a stored-power amount E(n+1) in the next n+1th first period is transmitted, and after the stored-power amount E(n+1) is received, calculates h(n+1) by using the above-described Equation (2).

Furthermore, the processor 12 stores the timing in which it is determined that the calculated variance value σ is more than "the first threshold" in the memory 13 and calculates "the time interval (i.e., the time stamp interval)" between the timings.

Then, if the calculated variance value σ is more than "the first threshold", the processor 12 determines whether "the first estimated time T", which is obtained by multiplying "the second estimated time T'" by "the weight coefficient", is more than the above-described "time interval". Then, if "the first estimated time T" is more than "the time interval", the processor 12 performs a control so as to set the target relay node 50 to a non-relay operating state and, if "the first estimated time T" is equal to or less than "the time interval", set the target relay node 50 to a stop state. Specifically, the processor 12 generates "a first command signal" for changing the state of the target relay node 50 into a stop state and transmits the generated first command signal to the target relay node 50. Furthermore, the processor 12 performs "network reconfiguration control" so as to set the different sensor node 50 to a relay operating state. Here, the processor 12 selects, as the different sensor node 50 that is to be changed into a relay operating state, the end node 50 that has the highest communication quality (LQI) among the end nodes 50 that are located in the neighborhood of the target relay node 50. Then, the processor 12 generates a "second command signal" for changing the state of the selected end node 50 into a relay operating state and transmits the generated second command signal to the end node 50. Furthermore, both the communication quality (LQI) and the amount of stored power may be used as the criteria to select the different sensor node 50 that is to be changed into a relay operating state.

The memory 13 stores various types of information that is transmitted from the sensor node 50 and various types of information that is calculated by the processor 12.

For example, the memory 13 stores the identification information on the neighboring node and the communication quality (LQI), transmitted from each of the sensor nodes 50, which are the transmission sources, in relation to the identification information on the transmission source.

Furthermore, the memory 13 stores "the consumed-power amount Ee", transmitted from each of the sensor nodes 50 that are the transmission sources, in relation to the identification information on the transmission source.

Furthermore, the memory 13 stores "the consumed-power amount Er", transmitted from the relay node 50 that is the transmission source, in relation to the identification information on the transmission source.

Furthermore, the memory 13 stores the stored-power amount E(n), transmitted from the relay node 50 that is the transmission source in each stored-power amount report cycle, in relation to the identification information on the transmission source.

Furthermore, the memory 13 stores the power generation speed h(n) that is calculated by the processor 12 using the above-described Equation (2) with regard to each first period. Furthermore, as described above, the memory 13 may store the power generation speed h(n), which is calculated by the processor 12 using the above-described Equation (2) with regard to each first period, in relation to the type information (e.g., a period of time (morning, noon, night, or the like) or a season (spring, summer, fall, or winter)) on each first period.

Example of the Operation of the Wireless Sensor Network System

Figure 4:
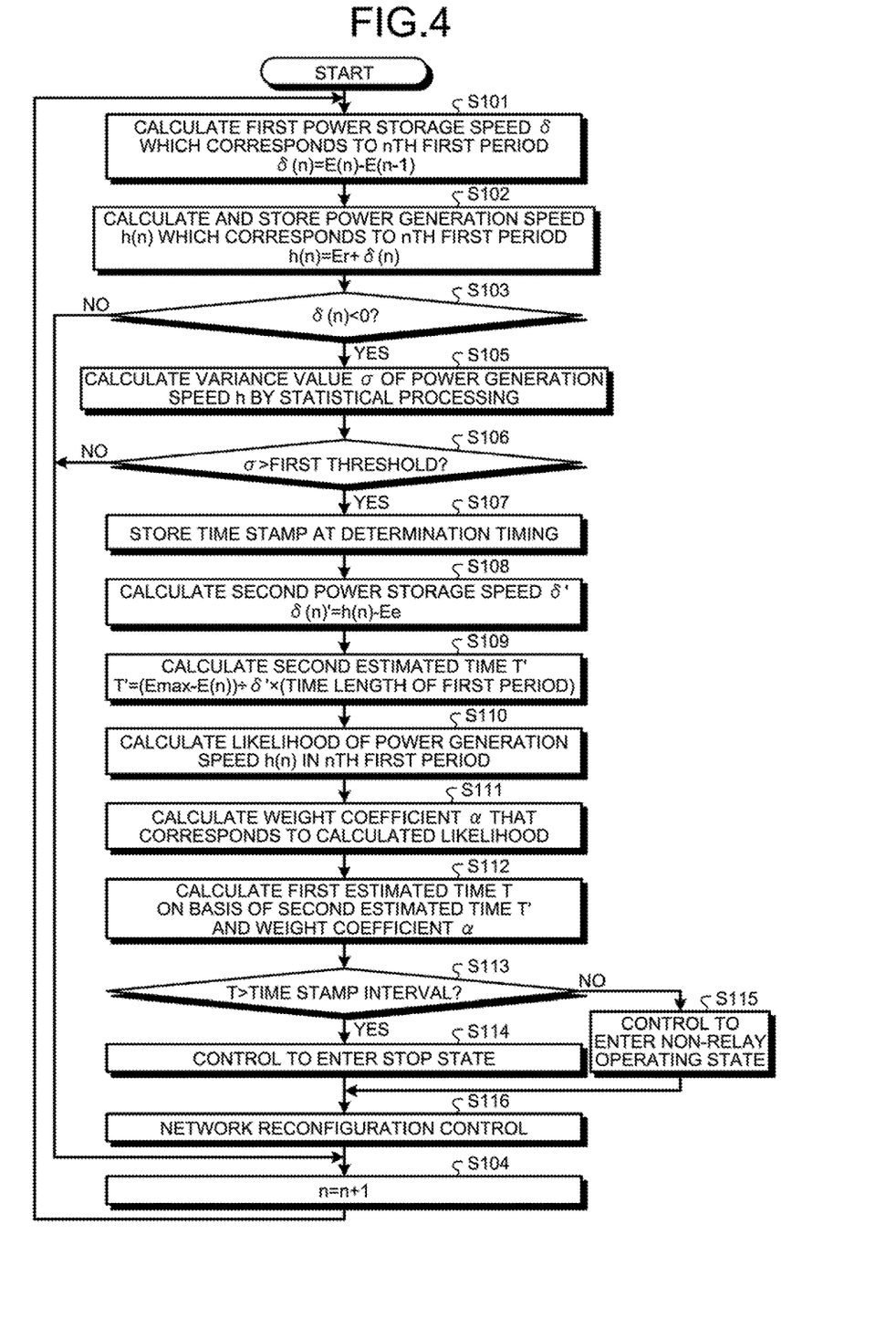
FIG. 4 is a flowchart that illustrates an example of the processing operation of the server according to the embodiment.

An explanation is given of an example of the processing operation of the wireless sensor network system 1 that has the above-described configuration. Here, particularity, an example of the processing operation of the server 10 is explained. FIG. 4 is a flowchart that illustrates an example of the processing operation of the server according to an embodiment. Here, the flowchart of FIG. 4 is performed with respect to each of the target relay nodes 50.

In the server 10, the processor 12 calculates the first power storage speed $\delta(n)$, which corresponds to the previous first period, i.e., the nth first period, by using the above-described Equation (1) with regard to the target relay node 50 (Step S101).

The processor 12 calculates the power generation speed $h(n)$, which corresponds to the nth first period, by using the above-described Equation (2) and stores it in the memory 13 (Step S102).

Figure 5:
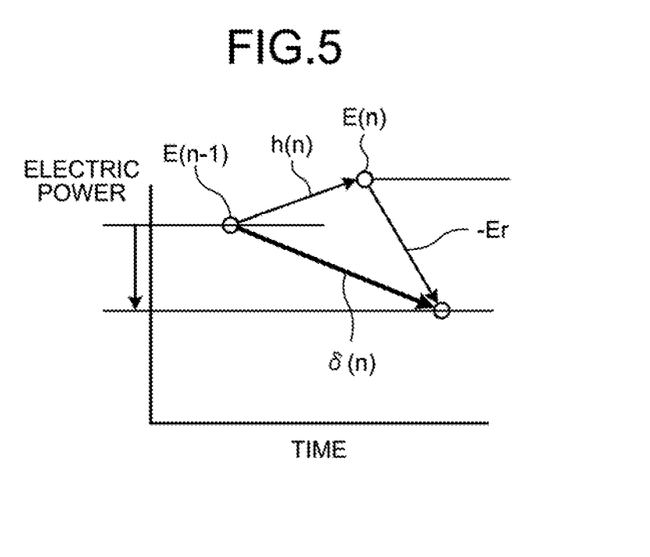
FIG. 5 is a diagram that illustrates the relationship among a first power storage speed, an amount of consumed power, and a power generation speed.
Figure 6:
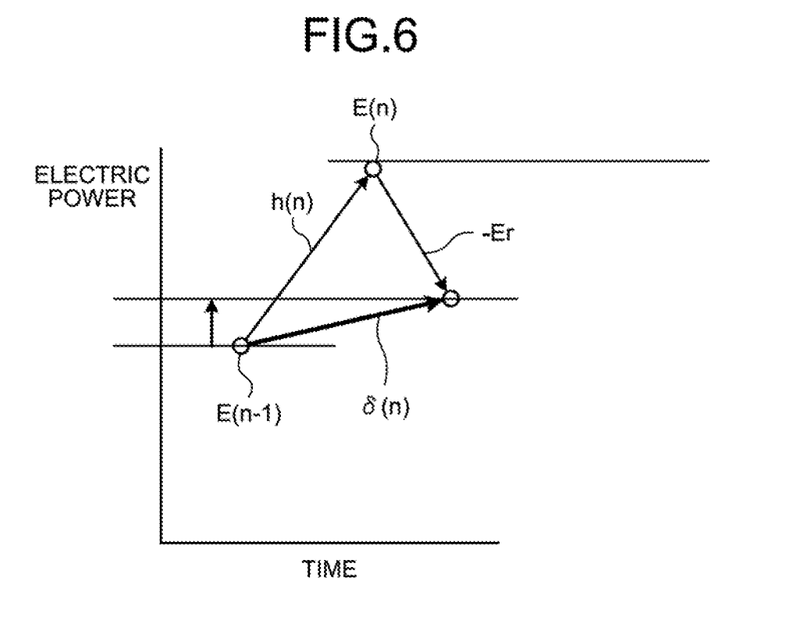
FIG. 6 is a diagram that illustrates the relationship among the first power storage speed, the amount of consumed power, and the power generation speed.

Here, the relationship among the first power storage speed $\delta(n)$, the consumed-power amount Er, and the power generation speed $h(n)$ is explained with reference to FIGS. 5 and 6. FIGS. 5 and 6 are diagrams that illustrate the relationship among the first power storage speed, the amount of consumed power, and the power generation speed.

As illustrated in FIG. 5, the first power storage speed $\delta(n)$ may be obtained by subtracting the stored-power amount E(n−1) in the n−1th first period from the stored-power amount E(n) in the nth first period, as represented by Equation (1). Furthermore, the consumed-power amount Er may be obtained based on the characteristics of the target relay node 50 once the topology is defined, and it may be considered that it is stable. A power consumption speed is (−Er). Furthermore, the first power storage speed $\delta(n)$ is equal to the sum of the power generation speed $h(n)$ and the power consumption speed (−Er). By focusing attention on this relationship, the difference between the first power storage speed $\delta(n)$ and the power consumption speed (−Er) is calculated to obtain the power generation speed $h(n)$, which is difficult to be directly observed. FIG. 5 illustrates a case where the first power storage speed $\delta(n)$ is positive, and FIG. 6 illustrates a case where the first power storage speed $\delta(n)$ is negative.

With reference back to FIG. 4, the processor 12 determines whether the first power storage speed $\delta(n)$ is negative (Step S103).

If the first power storage speed $\delta(n)$ is not negative (No at Step S103), the processor 12 increments n (Step S104), waits for a report of the stored-power amount E(n+1) in the n+1th first period and, when the stored-power amount E(n+1) is received, performs the operation at Step S101.

If the first power storage speed $\delta(n)$ is negative (Yes at Step S103), the processor 12 calculates the variance value $\sigma$ of the power generation speed h by statistical processing (Step S105).

Figure 7:
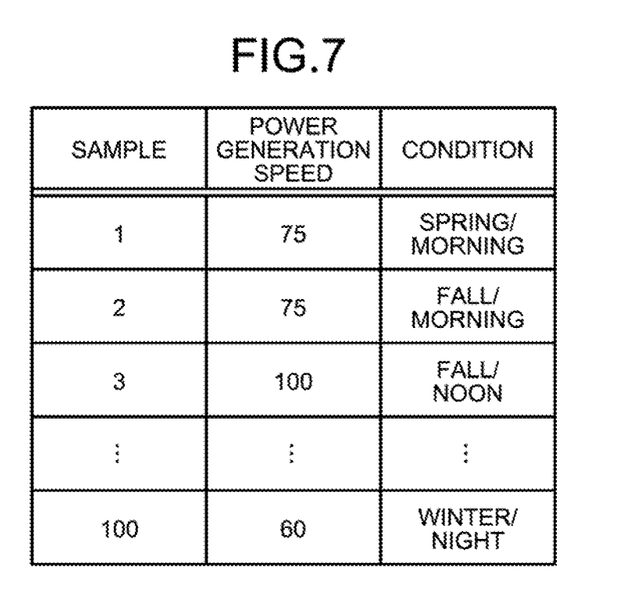
FIG. 7 is a diagram that illustrates an example of the power-generation speed sample table.
Figure 8:
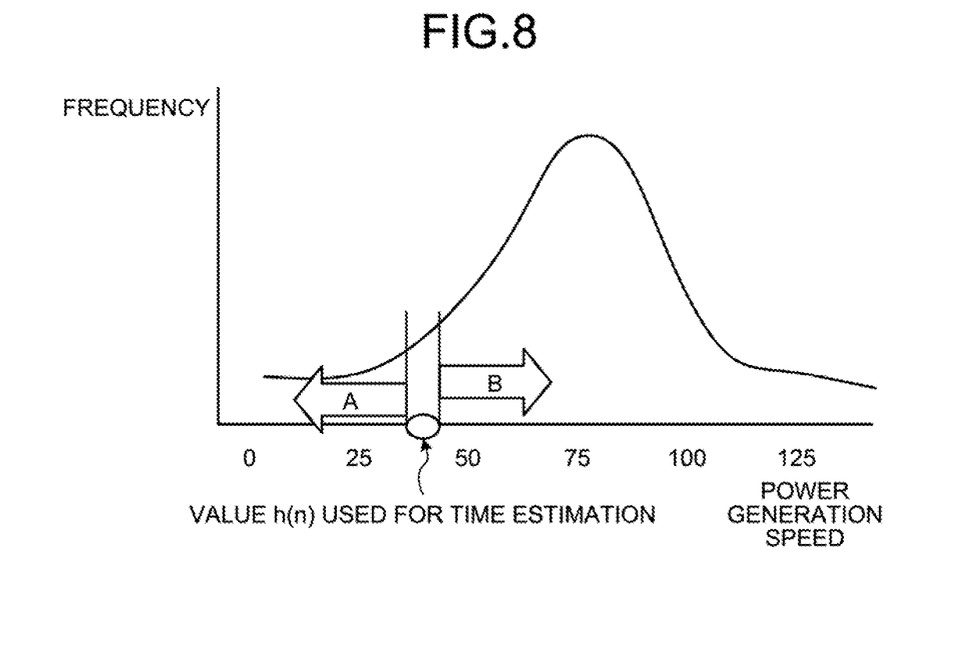
FIG. 8 is a diagram that illustrates an example of the distribution of the power generation speed.

For example, in the "power-generation speed sample table" illustrated in FIG. 7, the memory 13 stores the power generation speed $h(n)$, which is calculated in each first period, and the type information (described as "condition" in FIG. 7) on the first period that corresponds to the power generation speed $h(n)$ in relation to each other. The "power-generation speed sample table" is prepared for each of the target relay nodes 50. Furthermore, for example, the processor 12 generates the distribution (see FIG. 8) of the power generation speed h that matches the condition of, for example, "fall, noon" from "the power-generation speed sample table". The processor 12 calculates the variance value $\sigma$ from the distribution of the power generation speed h. FIG. 7 is a diagram that illustrates an example of the power-generation speed sample table. FIG. 8 is a diagram that illustrates an example of the distribution of the power generation speed.

With reference back to FIG. 4, the processor 12 determines whether the calculated variance value $\sigma$ is more than the first threshold (Step S106).

If the calculated variance value $\sigma$ is more than the first threshold (Yes at Step S106), the processor 12 stores the time stamp that is at the timing in which the above determination is made (Step S107). Here, "the calculated variance value $\sigma$ is more than the first threshold" means that "the power generation speed h of the target relay node 50 largely fluctuates, and the reliability of the power generation speed $h(n)$ is low". Furthermore, if the calculated variance value $\sigma$ is equal to or smaller than the first threshold (No at Step S106), the processing step proceeds to Step S104.

The processor 12 calculates the second power storage speed $\delta'(n)$ in a case where the target relay node 50 is in a non-relay operating state by using the above-described Equation (3) (Step S108).

By using the above-described Equation (4), the processor 12 calculates "the second estimated time T'" that is needed to reach the target power-storage value in a case where the target relay node 50 is in a non-relay operating state (Step S109).

Figure 9:
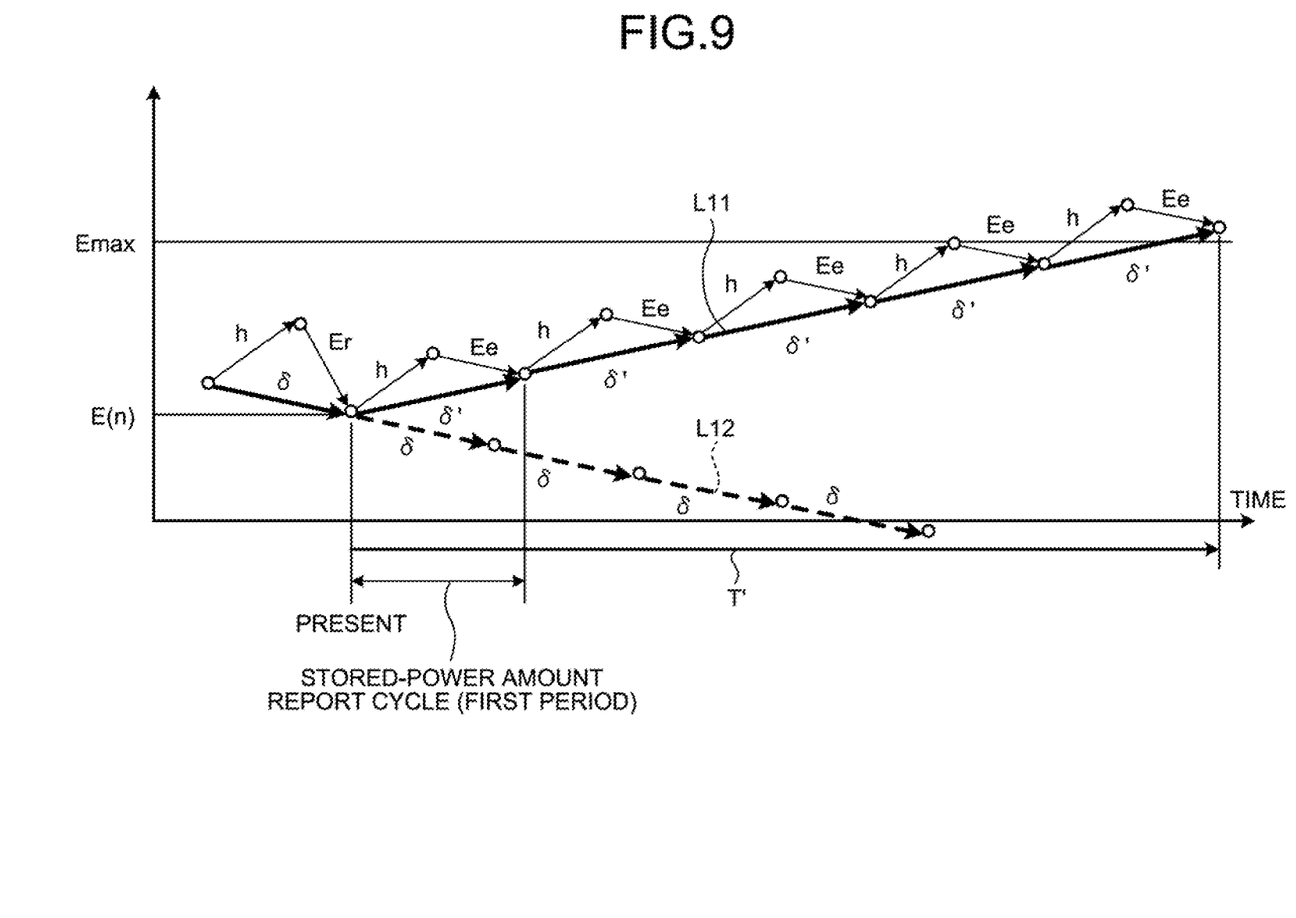
FIG. 9 is a diagram that illustrates a second estimated time.

FIG. 9 is a diagram that illustrates the second estimated time. As illustrated in FIG. 9, with regard to the target relay node 50, there is a high possibility that, even though the first power storage speed $\delta(n)$ in the nth first period ("present" in FIG. 9) is negative, the second power storage speed $\delta'(n)$ becomes positive after the target relay node 50 enters a non-relay operating state. Furthermore, the processor 12 determines "the second estimated time T'" that is needed to reach Emax if the amount of stored power increases at the second power storage speed $\delta'(n)$. In the example illustrated in FIG. 9, the second estimated time T'=5×(the time length of the first period). Here, a line L11, indicated by the solid line in FIG. 9, represents the transition of the amount of stored power in a case where the target relay node 50 is in a non-relay operating state, and L12, indicated by the dotted line, represents the transition of the amount of stored power in a case where the target relay node 50 is continuously in a relay operating state.

With reference back to FIG. 4, the processor 12 calculates "the likelihood" of the power generation speed $h(n)$ that corresponds to the nth first period (Step S110). For example, by using the entire number of samples that constitute the distribution illustrated in FIG. 8, the probability of occurrence of samples that have the same value as the power generation speed $h(n)$, which corresponds to the nth first period, is calculated so that "the likelihood" of the power generation speed $h(n)$, which corresponds to the nth first period, may be calculated. In FIG. 8, the likelihood is decreased in the direction of the arrow A, and the likelihood is increased in the direction of the arrow B until it reaches the central value.

The processor 12 calculates the weight coefficient $\alpha$ that corresponds to the calculated likelihood (Step S111).

The processor 12 calculates "the first estimated time T" based on the calculated "second estimated time T'" and the calculated weight coefficient $\alpha$ (Step S112). For example, the processor 12 multiples the second estimated time T' by the weight coefficient α to calculate the first estimated time T.

The processor 12 determines whether the calculated first estimated time T is more than the time stamp interval (Step S113).

If the calculated first estimated time T is more than the time stamp interval (Yes at Step S113), the processor 12 controls the state of the target relay node 50 so as to enter a "stop state" (Step S114). For example, the processor 12 generates "a first command signal" for changing the state of the target relay node 50 into a stop state and transmits the generated first command signal to the target relay node 50. Specifically, it is considered that, if the calculated first estimated time T is more than the time stamp interval, there is a high possibility that the amount of stored power becomes insufficient in the near future even though the target relay node 50 enters a "non-relay operating state". Therefore, if the calculated first estimated time T is more than the time stamp interval, the target relay node 50 enters a "stop state" so that it is dedicated to power generation and power storage.

If the calculated first estimated time T is equal to or less than time stamp interval (No at Step S113), the processor 12 controls the state of the target relay node 50 so as to enter a "non-relay operating state" (Step S115). For example, the processor 12 generates "a second command signal" for changing the state of the selected end node 50 into a relay operating state and transmits the generated second command signal to the end node 50. Specifically, it is considered that, if the calculated first estimated time T is equal to or less than the time stamp interval, there is a low possibility that the amount of stored power becomes insufficient in the near future even though the target relay node 50 enters a "non-relay operating state". Therefore, if the calculated first estimated time T is equal to or less than the time stamp interval, the target relay node 50 enters a "non-relay operating state" so that it operates as an end node.

The processor 12 conducts "network reconfiguration control", i.e., "network reconfiguration control" to set the different sensor node 50 to a relay operating state (Step S116). Then, the process flow transitions to Step S104.

Figure 10:
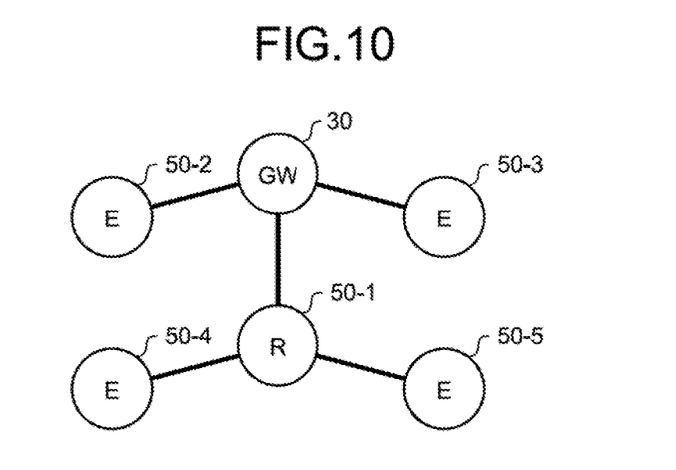
FIG. 10 is a diagram that illustrates the processing operation of the server according to the embodiment.
Figure 11:
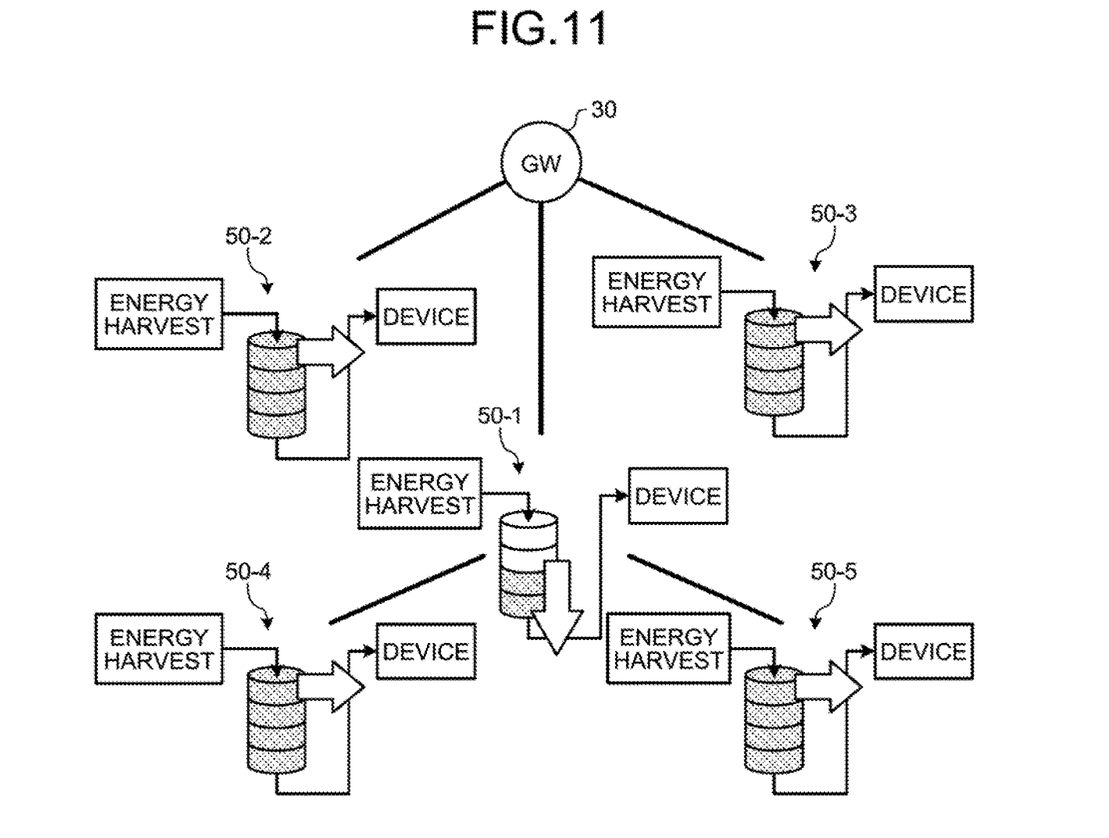
FIG. 11 is a diagram that illustrates the processing operation of the server according to the embodiment.
Figure 12:
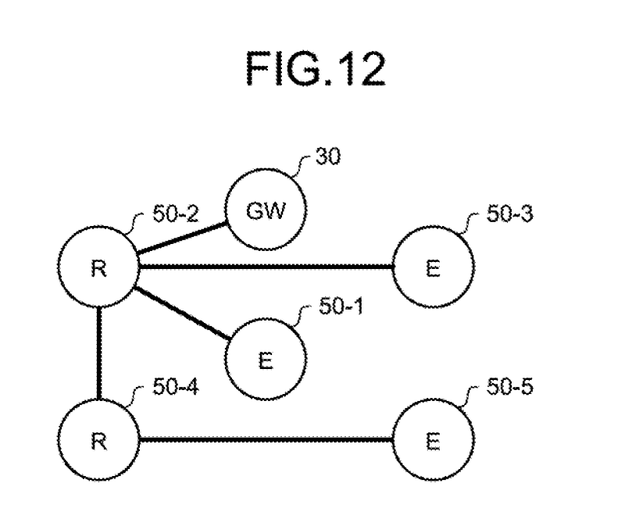
FIG. 12 is a diagram that illustrates the processing operation of the server according to the embodiment.

As the server 10 performs the above-described processing operation, the following function change is made. FIGS. 10 to 13 are diagrams that illustrate the processing operation of the server according to the embodiment. Each of FIGS. 10 to 13 illustrates the gateway 30 and the sensor nodes 50-1 to 5 in the wireless sensor network system 1 that is illustrated in FIG. 1. In FIGS. 10 and 12, R denotes a relay node, and E denotes an end node. Furthermore, in FIGS. 11 and 13, Energy Harvest corresponds to the energy harvesting unit 51, a functional unit, illustrated in a cylindrical shape, corresponds to a battery, and Device corresponds to the processor 54 and the wireless unit 55. Moreover, in FIGS. 11 and 13, the downward arrow indicates that the power storage speed is negative, the horizontal arrow indicates that the power storage speed is zero, and the upward arrow indicates that the power storage speed is positive.

FIG. 10 illustrates the wireless sensor network system 1 that has the same topology as that in FIG. 1. As the sensor node 50-1 operates as a relay node, the amount of stored power is likely to decrease as compared to the different sensor node 50 that operates as an end node. That is, as illustrated in FIG. 11, there is a high possibility that the first power storage speed δ(n) of the sensor node 50-1 becomes negative.

Figure 13:
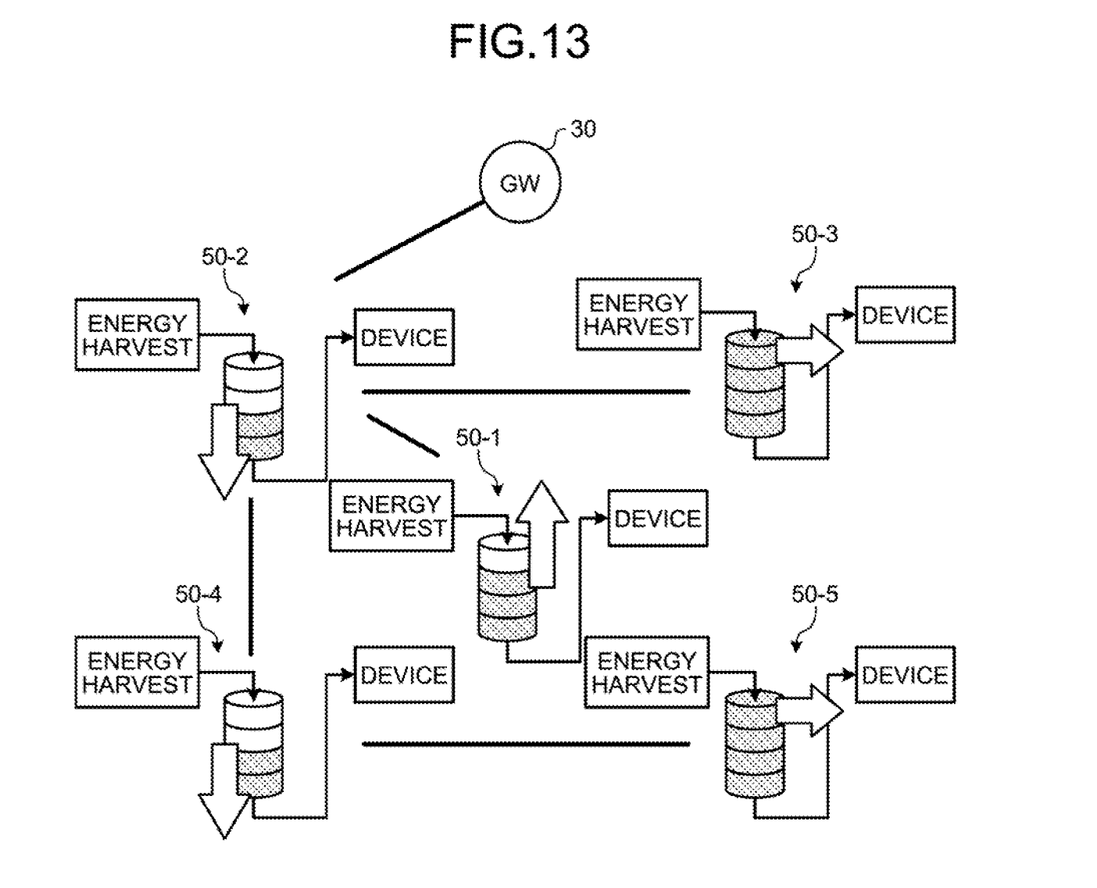
FIG. 13 is a diagram that illustrates the processing operation of the server according to the embodiment.

Therefore, the server 10 changes the function (state) of the sensor node 50-1. For example, as illustrated in FIG. 12, the server 10 changes the function of the sensor node 50-1 into an end node meanwhile it changes the functions of the sensor nodes 50-2, 4 into a relay node. As the function is changed in this manner, there may be a high possibility that the first power storage speed δ(n) of the sensor node 50-1 becomes positive, as illustrated in FIG. 13. Thus, the amount of stored power in the sensor node 50-1 may be prevented from being insufficient, and therefore the multihop communication path in the wireless sensor network system 1 may be stable.

According to the present embodiment as described above, if the first power storage speed of the sensor node 50-1, which is the target relay node among the sensor nodes 50-1 to 5, is negative, the processor 12 in the server 10 calculates the first estimated time that is needed to reach the target power-storage value in a case where the sensor node 50-1 is in a non-relay operating state. Then, in accordance with the length of the calculated first estimated time, the processor 12 changes the state of the sensor node 50-1 into a non-relay operating state or a stop state and changes the state of another node, which is in a non-relay operating state, into a relay operating state.

With the configuration of the server 10, if it is determined that the electric power is likely to run out, the function of the sensor node 50-1, which is the target relay node 50, may be changed before the electric power runs out; therefore, the multihop communication path in the wireless sensor network system 1 may be stable. Furthermore, if it is estimated that it takes a long time to reach the target power-storage value even though a non-relay operating state is set, the sensor node 50-1 is dedicated to power generation and power storage; thus, the sensor node 50-1 may promptly return to a desirable power state. As a result, the sensor node 50-1 may aid in stabilizing the multihop communication path after it returns to the multihop network.

Furthermore, if a variance of a plurality of power generation speeds, acquired in a plurality of first periods before the target period (i.e., the current first period) is more than a predetermined value with regard to the sensor node 50-1, the processor 12 calculates the second power storage speed in a case where the sensor node 50-1 is in a non-relay operating state in accordance with the power generation speed that is acquired in the target period. Then, the processor 12 divides the difference value between the target power-storage value and the amount of stored power of the sensor node 50-1 in the target period by the calculated second power storage speed and multiplies a division result by the time length of the first period, thereby calculating the second estimated time. Then, the processor 12 multiplies the calculated second estimated time by the weight coefficient that corresponds to the likelihood of the power generation speed, acquired in the target period, thereby calculating the first estimated time.

With the configuration of the server 10, the first estimated time may be calculated in consideration of the certainty of the power generation speed that is acquired during the target period, i.e., the degree of fluctuation of the power generation speed. As a result, the state of the sensor node 50-1 may be changed in consideration of uncertainty, and therefore the multihop communication path in the wireless sensor network system 1 may be more stable.

According to the disclosed aspect, it is possible to stabilize the multihop communication path in a wireless sensor network.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device comprising:
a processor configured to:
control a multihop communication path in a wireless network that includes a node group;
when a first power storage speed of a target relay node in the node group is negative, calculate a first estimated time that is needed to reach a target power-storage value in a case where the target relay node is in a non-relay operating state; and
in accordance with a length of the first estimated time calculated, change a state of the target relay node into the non-relay operating state or a stop state and change a state of another node, which is in the non-relay operating state, into a relay operating state, wherein
when the first estimated time that is needed to reach the target power-storage value in the case where the target relay node is in the non-relay operating state is calculated to be more than a predetermined length of time, the target relay node is dedicated to power generation and power storage to promptly return to a desirable power state.

2. The control device according to claim 1, wherein the processor is further configured to:
acquire a plurality of first power storage speeds that correspond to a plurality of periods with regard to the target relay node and a plurality of power generation speeds that correspond to the plurality of periods with regard to the target relay node;
in accordance with a power generation speed that is acquired in a target period included in the plurality of periods, calculate a second power storage speed in a case where the target relay node is in the non-relay operating state;
divide a difference value between the target power-storage value and an amount of stored power of the target relay node in the target period by the second power storage speed calculated and, in accordance with a division result, calculates a second estimated time; and
calculate the first estimated time by multiplying the second estimated time calculated by a weight coefficient that corresponds to a likelihood of the power generation speed that is acquired in the target period.

3. The control device according to claim 2, wherein when a variance of the plurality of power generation speeds, acquired up to the target period, is more than a predetermined value, the processor is further configured to multiply the second estimated time calculated by the weight coefficient that corresponds to the likelihood of the power generation speed that is acquired in the target period, to calculate the first estimated time.

4. The control device according to claim 3, wherein the processor is further configured to:
calculate a time interval during which the variance of the plurality of power generation speeds, acquired up to the target period, is determined to be more than the predetermined value; and
when the first estimated time calculated is more than the time interval calculated, set the target relay node to the stop state, and when the first estimated time calculated is equal to or less than the time interval calculated, set the target relay node to the non-relay operating state.

5. A control method comprising:
controlling a multihop communication path in a wireless network that includes a node group, by a processor;
when a first power storage speed of a target relay node in the node group is negative, calculating a first estimated time that is needed to reach a target power-storage value in a case where the target relay node is in a non-relay operating state, by the processor; and
in accordance with a length of the first estimated time calculated, changing a state of the target relay node into the non-relay operating state or a stop state and changing a state of another node, which is in the non-relay operating state, into a relay operating state, by the processor, wherein
when the first estimated time that is needed to reach the target power-storage value in the case where the target relay node is in the non-relay operating state is calculated to be more than a predetermined length of time, the target relay node is dedicated to power generation and power storage to promptly return to a desirable power state.

6. A non-transitory computer-readable recording medium storing therein a control program that causes a computer to execute a process comprising:
controlling a multihop communication path in a wireless network that includes a node group;
when a first power storage speed of a target relay node in the node group is negative, calculating a first estimated time that is needed to reach a target power-storage value in a case where the target relay node is in a non-relay operating state; and
in accordance with a length of the first estimated time calculated, changing a state of the target relay node into the non-relay operating state or a stop state and changing a state of another node, which is in the non-relay operating state, into a relay operating state, wherein
when the first estimated time that is needed to reach the target power-storage value in the case where the target relay node is in the non-relay operating state is calculated to be more than a predetermined length of time, the target relay node is dedicated to power generation and power storage to promptly return to a desirable power state.

* * * * *